US010048153B2

(12) United States Patent
Nishiyuki et al.

(10) Patent No.: US 10,048,153 B2
(45) Date of Patent: Aug. 14, 2018

(54) PRESSURE SENSOR INCLUDING VARIABLE MEMBER HAVING REAR END CONNECTED TO HOUSING AT A PREDETERMINED AXIAL POSITION (71) Applicant: NGK SPARK PLUG CO., LTD., Nagoya-shi, Aichi (JP)

(72) Inventors: Kenjiro Nishiyuki, Inazawa (JP); Toshiki Hirokawa, Nagoya (JP); Akimitsu Sassa, Toukai (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 229 days.

(21) Appl. No.: 14/836,531

(22) Filed: Aug. 26, 2015

(65) Prior Publication Data

US 2016/0061683 A1    Mar. 3, 2016

(30) Foreign Application Priority Data

Aug. 27, 2014  (JP) .................................. 2014-172466
Aug. 19, 2015  (JP) .................................. 2015-161689

(51) Int. Cl.
*G01M 15/08*   (2006.01)
*G01L 23/22*   (2006.01)
*G01M 15/04*   (2006.01)
*F23Q 7/00*    (2006.01)

(52) U.S. Cl.
CPC .............. *G01L 23/22* (2013.01); *F23Q 7/001* (2013.01); *G01M 15/042* (2013.01); *F23Q 2007/005* (2013.01)

(58) Field of Classification Search
USPC .............................. 73/114.16, 114.18, 114.19
See application file for complete search history.

(56) References Cited

U.S. PATENT DOCUMENTS

| 9,897,063 B2* | 2/2018 | Maeda ................. F02P 19/028 |
| 2010/0037698 A1 | 2/2010 | Kern et al. |
| 2011/0088460 A1* | 4/2011 | Mueller ................. G01L 23/10 |
| | | 73/114.19 |

(Continued)

FOREIGN PATENT DOCUMENTS

DE    102012219824 A1   4/2014
JP    2010-511880 A     4/2010

(Continued)

OTHER PUBLICATIONS

Communication dated Feb. 23, 2016, issued by the European Patent Office in corresponding European Application No. 15182039.6.

*Primary Examiner* — Eric S McCall
(74) *Attorney, Agent, or Firm* — Sughrue Mion, PLLC (57) ABSTRACT

A variable member is connected to a rod-shaped member and connected to a tube portion to ensure airtightness within a housing, and deforms when the rod-shaped member is displaced relative to the housing along an axial direction. A position of the connection between the tube portion and the variable member in the axial direction is a position shifted from a rear end of a gap toward a front side by a predetermined length or a position at the front side with respect to the position shifted by the predetermined length. The predetermined length is a length which is 50% of a length of the gap in the axial direction.

5 Claims, 6 Drawing Sheets (56) References Cited

U.S. PATENT DOCUMENTS

| | | | |
|---|---|---|---|
| 2011/0192358 A1* | 8/2011 | Ramond | F23Q 7/001 123/2 |
| 2013/0319094 A1* | 12/2013 | Nakamura | G01M 15/08 73/114.19 |
| 2015/0047592 A1* | 2/2015 | Watanabe | F23Q 7/001 123/145 A |
| 2015/0048066 A1 | 2/2015 | Maeda et al. | |
| 2015/0114095 A1* | 4/2015 | Hatta | B23K 15/0006 73/114.18 |
| 2015/0334777 A1* | 11/2015 | Sassa | G01L 9/0051 219/201 |
| 2016/0076971 A1* | 3/2016 | Hirokawa | F23Q 7/001 73/114.18 |

FOREIGN PATENT DOCUMENTS

| | | |
|---|---|---|
| WO | 2013/157269 A1 | 10/2013 |
| WO | 2014/067722 A1 | 5/2014 |

\* cited by examiner

EMBODIMENT 1

FIG. 3

EMBODIMENT 2

FIG. 4

EMBODIMENT 3

FIG. 5

REFERENCE EMBODIMENT

FIG. 6

EMBODIMENT 4

PRESSURE SENSOR INCLUDING VARIABLE MEMBER HAVING REAR END CONNECTED TO HOUSING AT A PREDETERMINED AXIAL POSITION

TECHNICAL FIELD

The present invention relates to a pressure sensor.

BACKGROUND ART

A glow plug is known which is mounted on an internal combustion engine and in which a sensor for measuring the pressure in a combustion chamber is incorporated in a housing. In an example of a structure for achieving such pressure measurement, a rod-shaped heater is configured to be displaced in an axial direction in response to pressure, and the displacement of the rod-shaped heater is detected. In order to ensure airtightness between the heater and the housing while a displacement of the heater is achieved to a detectable degree in this method, a configuration is known in which the heater and the housing are connected to each other by a variable member (connection member). Such a glow plug is configured such that, when the variable member receives a pressure, an axial force is exerted to the rod-shaped heater (e.g., Patent Document 1).

PRIOR ART DOCUMENT

Patent Document

[Patent Document 1] International Publication No. 2013/157269

SUMMARY OF THE INVENTION

Problems to be Solved by the Invention

With combustion of fuel, a soot component occurs in the combustion chamber. The soot component is, for example, soot, HC, or the like, and is generated from combustion gas. The generated soot component enters a gap formed between the variable member and another member (the housing, etc.), and adheres to and accumulates on the surface of each member. In particular, if a gap between the variable member and another member is narrow, adhesion and accumulation of the soot component becomes remarkable. When the soot component adheres and accumulates in the gap as described above, almost no pressure is transmitted to the gap, so that the pressure receiving area of a portion (hereinafter, referred to as "pressure receiving portion") of the variable member which portion is deformed by receiving a pressure (pressure reception) decreases. Thus, there is a problem that, along with operation of the internal combustion engine, the pressure receiving area of the variable member in the glow plug decreases, resulting in a change in pressure measurement sensitivity (hereinafter, referred to as "sensitivity change".

The above-described problem is not limited to a glow plug with a pressure sensor, but is common in general pressure sensors having a similar mechanism.

Means for Solving the Problems

The present invention is intended to solve the above-described problem, and can be embodied in the following modes.

(1) According to one mode of the present invention, a pressure sensor is provided which includes: a rod-shaped member extending along an axial direction; a tubular housing within which the rod-shaped member is disposed in a state where a front end of the rod-shaped member projects therefrom; a tubular tube portion disposed with a gap from an inner wall of the housing and having a rear end connected to the housing; a variable member connected to the rod-shaped member and connected to the tube portion to ensure airtightness within the housing and configured to deform when the rod-shaped member is displaced relative to the housing along the axial direction; and an element, disposed at a rear side with respect to the variable member and within the housing, for measuring a pressure around the front end of the rod-shaped member on the basis of the displacement. In the pressure sensor, a rear end portion of the variable member extends from a front side of the gap toward the rear side of the gap; a position of the connection between the tube portion and the variable member in the axial direction is a position shifted from a rear end of the gap toward the front side by a predetermined length or a position at the front side with respect to the position shifted by the predetermined length; and the predetermined length is a length which is 50% of a length of the gap in the axial direction. According to this mode, the position of the connection between the tube portion and the variable member in the axial direction is the central position of the gap or the position at the front side with respect to the central position. Whereas a portion of the variable member at the front side with respect to the position of the connection with the tube portion functions as a pressure receiving portion, a portion of the variable member at the rear side with respect to the position of the connection does not function as a pressure receiving portion. Thus, by providing the position of the connection between the tube portion and the variable member at the central position of the gap in the axial direction or at the front side with respect to the central position, the variable member located at the rear side of the gap in which a soot component is likely to adhere and accumulate can be disabled to function as a pressure receiving portion. Therefore, in the pressure sensor, a sensitivity change due to adhesion and accumulation of the soot component at the variable member is suppressed.

(2) In the above mode, the rod-shaped member may be a heater which generates heat when being energized. According to this mode, the pressure sensor can be used as a glow plug with a pressure sensor.

(3) In the above mode, the predetermined length may be a length which is 75% of the length of the gap in the axial direction. According to this mode, a sensitivity change due to accumulation of the soot component is further suppressed.

(4) In the above mode, the predetermined length may be a length which is 100% of the length of the gap in the axial direction. According to this mode, a sensitivity change due to accumulation of the soot component is further suppressed.

(5) In the above mode, the variable member may have a thickness of not less than 0.13 mm and not greater than 0.23 mm. When the thickness of the variable member is not less than 0.13 mm and not greater than 0.23 mm, there is a more concern of a sensitivity change due to adhesion and accumulation of the soot component at the variable member. However, by using the above mode, a sensitivity change due to accumulation of the soot component is effectively suppressed.

The present invention can be embodied in various forms other than the above. For example, the present invention can be embodied in the form of a glow plug with a pressure sensor.

MODES FOR CARRYING OUT THE INVENTION

Figure 1:
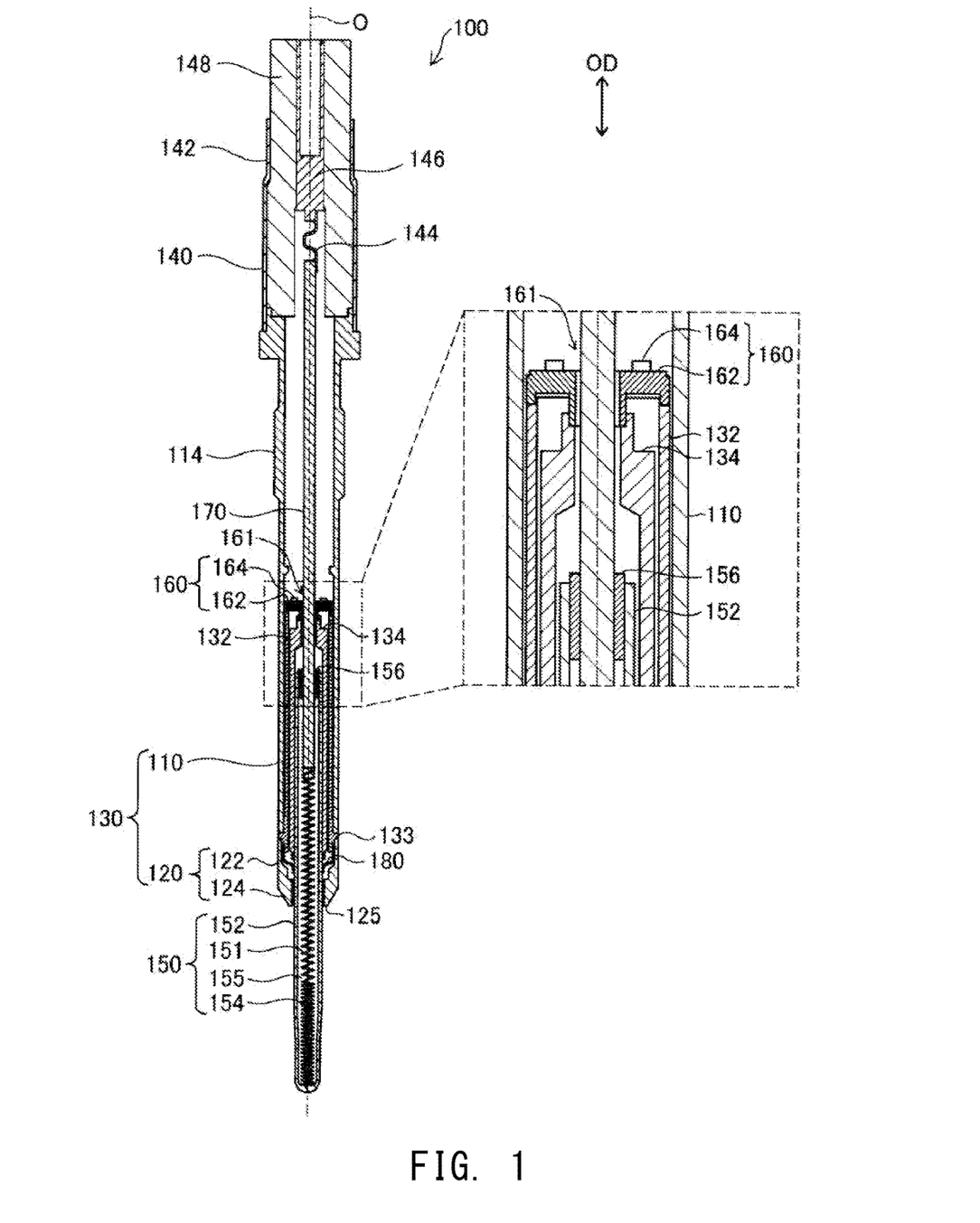
FIG. 1 Cross-sectional view of a glow plug.

Embodiment 1 will be described. FIG. 1 is a cross-sectional view of a glow plug 100. The lower side of an axis o of the glow plug 100 in FIG. 1 is defined as a front side of the glow plug 100, and the upper side of the axis o is defined as a rear side of the glow plug 100. A direction along the axis o of the glow plug 100 is defined as an axial direction OD.

As shown in FIG. 1, the glow plug 100 includes: a tubular housing 130 including a metallic shell 110 and a cap portion 120; a heater portion 150; a pressure sensor 160; a protection tube 140; a terminal spring 144; a metal terminal 146; and a connector member 148. FIG. 1 also shows the vicinity of the pressure sensor 160 in an enlarged manner.

The metallic shell 110 which is a component of the housing 130 is a substantially cylindrical metal member formed from carbon steel or stainless steel. A screw portion 114 for fixing the glow plug 100 to a cylinder head of a diesel engine is formed near the rear end of the metallic shell 110. The screw portion 114 has a screw groove (not shown), and the glow plug 100 is fixed to the diesel engine by screwing the screw groove into a plug-mounting hole of the cylinder head (not shown).

The protection tube 140 of the glow plug 100 is made of a metal and has electrical conductivity. The material of the protection tube 140 in the present embodiment is stainless steel (e.g., SUS410, SUS630, etc.). The protection tube 140 is formed in a cylindrical shape extending along the axial direction OD. The protection tube 140 is joined to a rear end portion of the housing 130. The metal terminal 146 is held via the connector member 148 at the inner side of the protection tube 140. At a rear end portion of the protection tube 140, a tool engagement portion 142 is formed which is engageable with a tool (not shown) which is used for fixing and detaching the glow plug 100 to and from the diesel engine.

The connector member 148 of the glow plug 100 has an electrical insulation property. The material of the connector member 148 in the present embodiment is an insulating resin. The connector member 148 is formed in a cylindrical shape. The metal terminal 146 is fixed at the inner side of the connector member 148.

The terminal spring 144 of the glow plug 100 is made of a metal and has electrical conductivity. The material of the terminal spring 144 in the present embodiment is, for example, a copper alloy or the like. The terminal spring 144 mechanically and electrically connects between a center shaft 170 and the metal terminal 146 and also absorbs a displacement of the center shaft 170 occurring with a displacement of the heater portion 150. The terminal spring 144 in the present embodiment is a curved plate spring.

The metal terminal 146 of the glow plug 100 is made of a metal and has electrical conductivity. The material of the metal terminal 146 in the present embodiment is, for example, a copper alloy or the like.

The cap portion 120 is disposed at the front end of the metallic shell 110. The cap portion 120 is an annular metal member formed from carbon steel or stainless steel. At the rear side of the cap portion 120, a cylindrical portion 122 is formed which has a thickness smaller than that of a front portion of the metallic shell 110 and has an outer diameter substantially equal to that of the metallic shell 110. At the front side of the cap portion 120, a tapered portion 124 is formed which has an outer diameter reduced toward a front end thereof.

The heater portion 150 is disposed within the housing 130 in a state where the front end of the heater portion 150 projects therefrom. The heater portion 150 includes a sheath tube 152, a heat generation coil 154, a control coil 151, and insulating powder 155. The sheath tube 152 is a tubular member extending along the axial direction OD, has a closed hemispheric front end, and has an opened rear end within the metallic shell 110. The sheath tube 152 is formed from stainless steel or the like which is excellent in heat resistance and corrosion resistance.

Each of the heat generation coil 154 and the control coil 151 is a winding resistor which resists and generates heat when being energized, and is held within the front side of the sheath tube 152. The center shaft 170 which is a rod-shaped member made of a metal is inserted in the heater portion 150, and the rear end of the control coil 151 is fixed to the front end of the center shaft 170. The front end of the heat generation coil 154 is fixed to the front end of the sheath tube 152. The heat generation coil 154 and the control coil 151 are supplied with power from the outside through the metal terminal 146, the terminal spring 144, and the center shaft 170. A gap between the heat generation coil 154 and the control coil 151, and the sheath tube 152 is filled with the insulating powder 155 which is magnesium oxide or the like having heat resistance.

A seal member 156 for sealing the insulating powder 155 within the sheath tube 152 is inserted between the center shaft 170 and the opened rear end of the sheath tube 152. The sheath tube 152 is subjected to swaging. Due to the swaging, the insulating powder 155 filling the interior of the sheath tube 152 becomes dense to improve the efficiency of heat conduction. The rear side of the heater portion 150 is disposed within the metallic shell 110. The front side of the heater portion 150 is disposed so as to project from an opening portion 125 of the cap portion 120 toward the front side in the axial direction OD.

Within the housing 130, the annular pressure sensor 160 disposed at the rear side with respect to the heater portion 150, a sensor fixing member 132 for fixing the pressure sensor 160 within the housing 130, a transmission sleeve 134 for transmitting a displacement of the heater portion 150 along the axial direction OD to the pressure sensor 160, and a variable member 180 for connecting the outer periphery of the heater portion 150 to the inner side of the housing 130, are provided.

The sensor fixing member 132 is a substantially cylindrical member formed from stainless steel or the like. The sensor fixing member 132 is disposed along the inner periphery of the metallic shell 110, and has a collar-shaped flange portion 133 formed at a front end portion thereof. The flange portion 133 is welded to the front end surface of the metallic shell 110. An outer peripheral portion of the pressure sensor 160 is welded to the rear end of the sensor fixing member 132. The sensor fixing member 132 fixes the pressure sensor 160 at a position near the center portion of the housing 130.

The transmission sleeve 134 is a substantially cylindrical member formed from stainless steel or the like. The transmission sleeve 134 is disposed between the sensor fixing member 132 and the heater portion 150. The front end of the transmission sleeve 134 is welded to the outer periphery of the heater portion 150 at a position near the position at which the flange portion 133 of the sensor fixing member 132 is formed. Meanwhile, the rear end of the transmission sleeve 134 is welded to an inner peripheral portion of the annular pressure sensor 160. A displacement of the heater portion 150 along the axial direction OD is transmitted to the inner peripheral portion of the pressure sensor 160 by the transmission sleeve 134.

The variable member 180 is a substantially tubular member having elasticity. The variable member 180 is formed from a material such as stainless steel or a nickel alloy by deep drawing. The material of the variable member 180 is INCONEL 718 (INCONEL is a registered trademark). The variable member 180 is entirely disposed within the housing 130, a rear end portion of the variable member 180 is welded to the front end of the sensor fixing member 132, and a front end portion of the variable member 180 is welded to the outer periphery of the heater portion 150 (sheath tube 152). The heater portion 150 is connected to the housing 130 by the variable member 180, and a displacement of the heater portion 150 along the axial direction OD is permitted by elastic deformation of the variable member 180. The variable member 180 also serves to ensure airtightness within the metallic shell 110 by connecting the heater portion 150 and the housing 130 to each other. The structure of the variable member 180 will be described in detail later.

The pressure sensor 160 is disposed within the housing 130 and at the rear side with respect to the heater portion 150 and the variable member 180, and includes: an annular metal diaphragm 162 provided at its center with an opening portion 161 through which the center shaft 170 extends; and a piezoresistor 164 joined to the upper surface (rear side surface) of the metal diaphragm 162.

The metal diaphragm 162 is formed from, for example, stainless steel or the like. An integrated circuit (not shown) provided at a predetermined portion within the housing 130 is electrically connected to the piezoresistor 164. As described above, the rear end of the transmission sleeve 134 connected to the heater portion 150 is joined to the inner periphery of the metal diaphragm 162. Thus, when the heater portion 150 receives a pressure (combustion pressure) within a combustion chamber to be displaced along the axial direction OD, an amount of the displacement is transmitted to the metal diaphragm 162 by the transmission sleeve 134 to deform the metal diaphragm 162.

The integrated circuit detects the deformation of the metal diaphragm 162 on the basis of a change in the resistance value of the piezoresistor 164, thereby detecting the combustion pressure of an internal combustion engine. The integrated circuit outputs an electric signal indicating the combustion pressure detected thus, to an external ECU or the like through a wire inserted in the rear end of the metallic shell 110.

Figure 2:
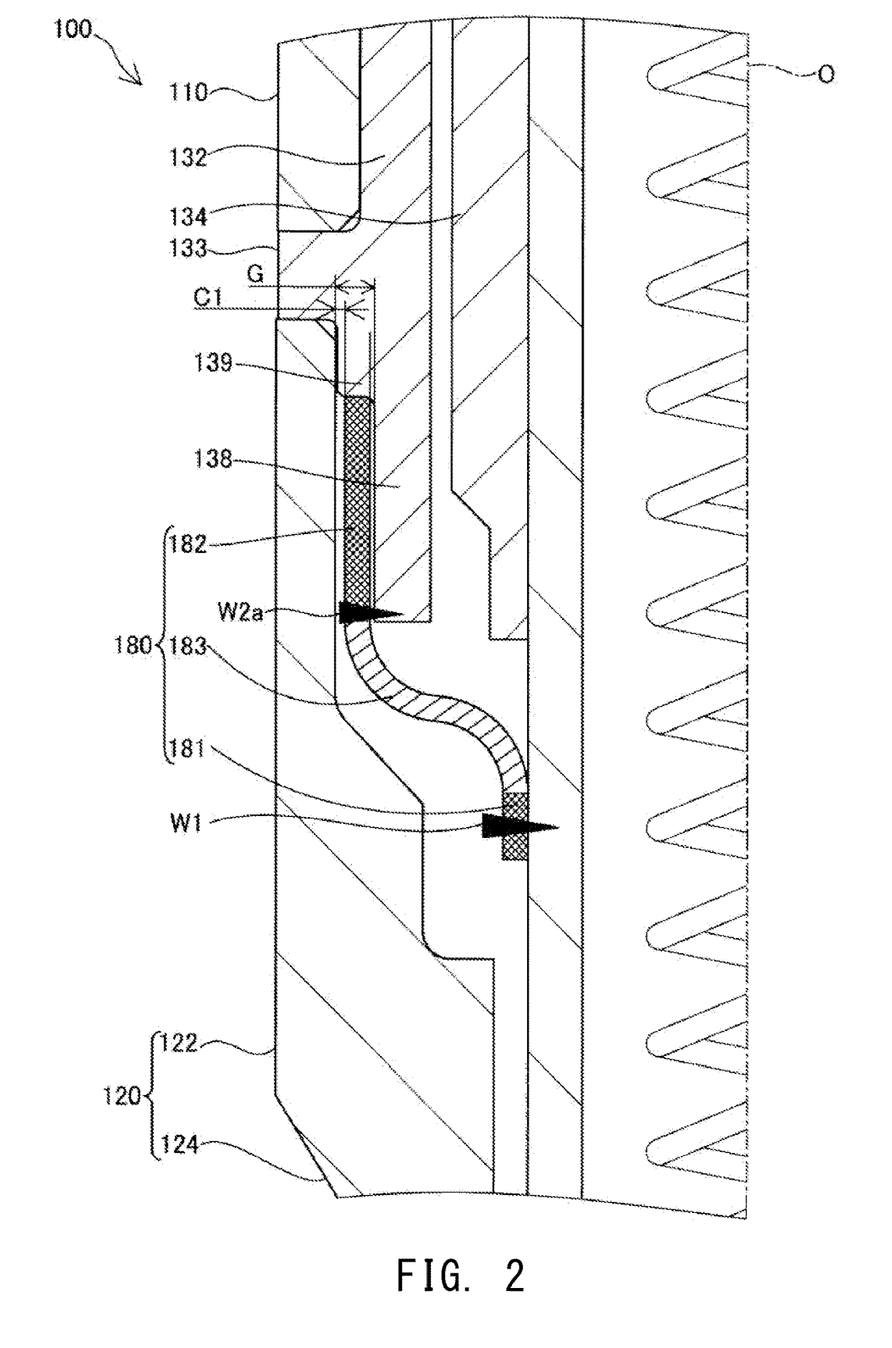
FIG. 2 Cross-sectional view of a variable member and its vicinity.

FIG. 2 is a cross-sectional view of the variable member 180 and its vicinity. The variable member 180 includes a first portion 181, a second portion 182, and a bent portion 183. The first portion 181 is formed in a substantially cylindrical shape extending along the axial direction OD, and is connected to the heater portion 150 by being laser-welded over the entire circumference of the first portion 181 (a welded portion W1). The second portion 182 extends along the axial direction OD and is formed in a substantially cylindrical shape having an outer diameter larger than that of the first portion 181. The second portion 182 is connected to the housing 130 via a gap forming portion 138 (corresponding to a "tube portion" in CLAIMS) of the sensor fixing member 132 by being laser-welded over the entire circumference of the second portion 182 (a welded portion W2a). The gap forming portion 138 is a substantially cylindrical portion of the sensor fixing member 132 which portion is at the front side with respect to the flange portion 133 and faces an inner wall of the cylindrical portion 122 of the cap portion 120 to form a gap G. The second portion 182 extends from the front side of the gap G toward the rear side of the gap G. The rear end of the gap forming portion 138 is connected to the housing 130 via the flange portion 133. The bent portion 183 is a portion which has a bent shape and connects the first portion 181 and the second portion 182 to each other.

A clearance C1 is formed between the inner peripheral surface of the cylindrical portion 122 and the outer peripheral surface of the second portion 182. A soot component adheres and accumulates in the clearance C1 as combustion of fuel is repeated.

As shown in FIG. 2, a step portion 139 having an outer diameter larger than that of the gap forming portion 138 is formed between the gap forming portion 138 and the flange portion 133 of the sensor fixing member 132. The front end surface of the step portion 139 is a flat surface which is located at the frontmost side in the step portion 139 and is orthogonal to the axis O. The front end surface of the step portion 139 defines the rear end of the gap G, and an end portion of the second portion 182 is in contact with the front end surface of the step portion 139.

Figure 3:
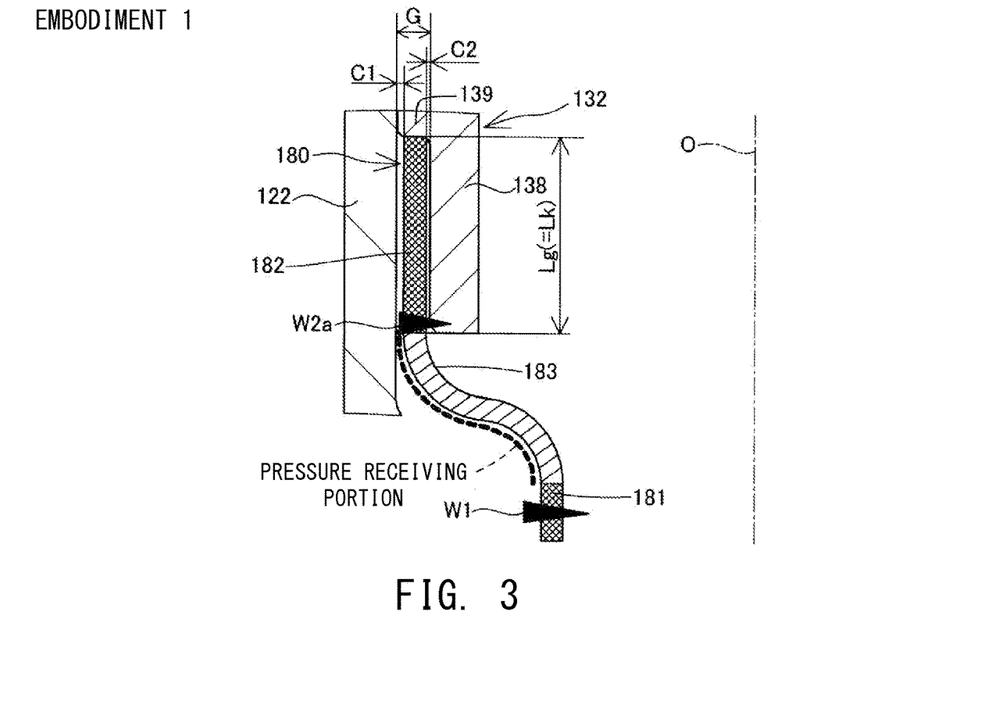
FIG. 3 Cross-sectional view of a part of a cylindrical portion, a gap forming portion, and a variable member.

FIG. 3 is a cross-sectional view of a part of the cylindrical portion 122, the gap forming portion 138, and the variable member 180. In the present embodiment, the average of the thicknesses of the first portion 181, the second portion 182, and the bent portion 183 is defined as the thickness of the variable member 180. In the present embodiment, any value which is not less than 0.13 mm and not greater than 0.23 mm is used as the thickness of the variable member 180. In another embodiment in which the thicknesses of at least two of the first portion 181, the second portion 182, and the bent portion 183 are different from each other, as the thickness of the variable member 180, the average thickness of the first portion 181, the second portion 182, and the bent portion 183 may be set at any value which is not less than 0.13 mm and not greater than 0.23 mm.

As shown in FIG. 3, the bent portion 183 is a pressure receiving portion. The pressure receiving portion is a portion of the variable member 180 which portion deforms when receiving the combustion pressure, to displace the heater portion 150 along the axial direction OD.

A clearance C2 is formed between the gap forming portion 138 and the second portion 182. Since the clearance C2 is formed, the second portion 182 is deformable radially inward (a direction toward the axis O) even at its portion whose position in the axial direction OD overlaps that of the gap forming portion 138. Thus, the second portion 182 functions as a pressure receiving portion even at its portion whose position in the axial direction OD overlaps that of the gap forming portion 138, if the portion is at the front side with respect to the welded portion W2a. However, in the present embodiment, since the welded portion W2a is located at the front end of the second portion 182, the second portion 182 does not include a portion which functions as a pressure receiving portion.

In the present embodiment, the length Lg of the gap forming portion 138 in the axial direction OD is equal to the length Lk from the front end surface of the step portion 139 to the front end of the second portion 182 in the axial direction OD. Hereinafter, a "length" means a length in the axial direction OD. In the present embodiment, the length Lk is equal to the length of the second portion 182.

Meanwhile, the position of connection between the second portion 182 and the gap forming portion 138 by the welded portion W2a is located at the front end of the gap forming portion 138. Thus, the position of the connection by the welded portion W2a can be represented as "a position shifted from the front end surface of the step portion 139 toward the front side by a length which is 100% of the length Lg, with the front end surface of the step portion 139 as a reference". In the present embodiment, the position of the front end of the welded portion W2a is defined as the position of the connection by the welded portion W2a. The front end of the second portion 182 can be represented also as the boundary between the second portion 182 and the bent portion 183.

According to Embodiment 1 described above, the second portion 182 does not function as a pressure receiving portion before accumulation of the soot component in the clearance C1. Thus, even if a degree to which the second portion 182 receives the combustion pressure changes due to accumulation of the soot component in the clearance C1, the change does not influence a displacement of the heater portion 150 in the axial direction OD. As a result, a sensitivity change (a change in the pressure measurement sensitivity) of the pressure sensor 160 is suppressed. The suppression of the sensitivity change is effective in that the suppression of the sensitivity change is exerted even when the variable member 180 is produced with a thickness (not less than 0.13 mm and not greater than 0.23 mm) that is sensitive to a sensitivity change, as in the present embodiment.

Figure 4:
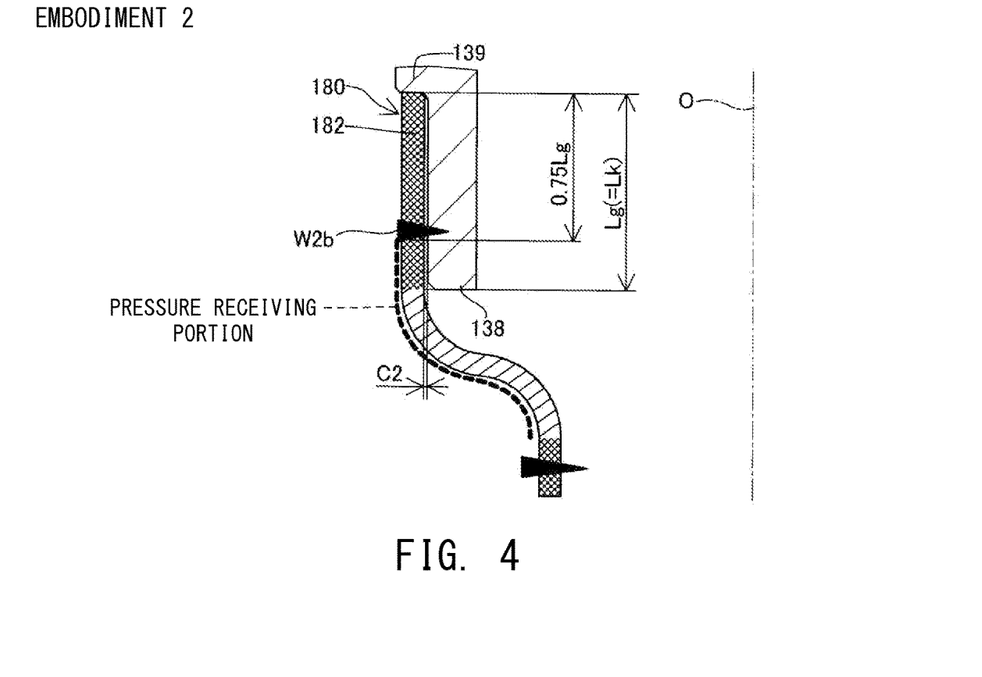
FIG. 4 Cross-sectional view of a gap forming portion and a variable member (Embodiment 2).

Embodiment 2 will be described. FIG. 4 is a cross-sectional view of the gap forming portion 138 and the variable member 180. Embodiment 2 is different from Embodiment 1 in the position of the connection between the gap forming portion 138 and the second portion 182, specifically, in the position of a welded portion W2b shown in FIG. 4.

The position of the connection by the welded portion W2b of Embodiment 2 is a position shifted from the front end surface of the step portion 139 toward the front side by a length which is 75% of the length Lg. As described above, a portion of the second portion 182 which portion is located at the front side with respect to the welded portion W2b functions as a pressure receiving portion.

Figure 5:
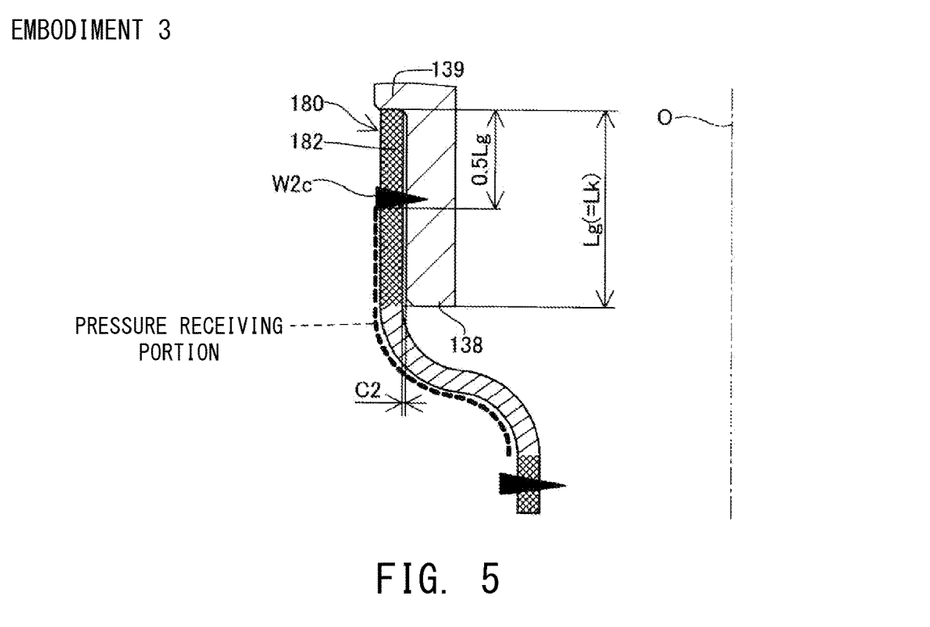
FIG. 5 Cross-sectional view of a gap forming portion and a variable member (Embodiment 3).

Embodiment 3 will be described. FIG. 5 is a cross-sectional view of the gap forming portion 138 and the variable member 180. Embodiment 3 is different from Embodiments 1 and 2 in the position of the connection between the gap forming portion 138 and the second portion 182, specifically, in the position of a welded portion W2c shown in FIG. 5.

The position of the connection by the welded portion W2c of Embodiment 3 is a position shifted from the front end surface of the step portion 139 toward the front side by a length which is 50% of the length Lg. As described above, a portion of the second portion 182 which portion is located at the front side with respect to the welded portion W2c functions as a pressure receiving portion.

According to Embodiments 2 and 3 described above, the pressure receiving portion is shortened in accordance with the positions of the welded portions W2b and W2c, and thus a sensitivity change is suppressed as compared to the conventional art.

Figure 6:
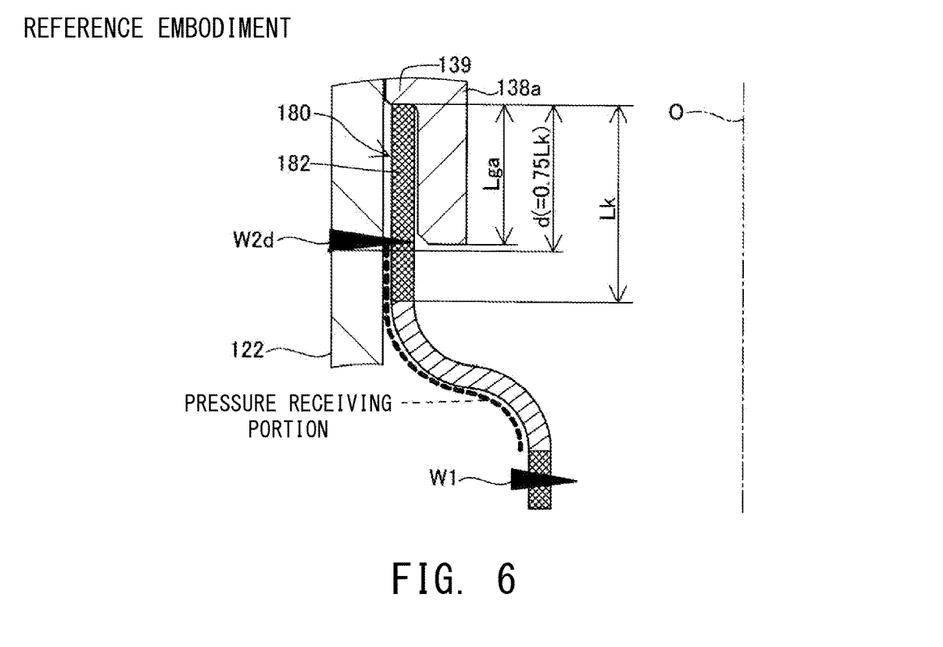
FIG. 6 Cross-sectional view of a part of a cylindrical portion, a gap forming portion, and a variable member (a reference embodiment).

A reference embodiment will be described. FIG. 6 is a cross-sectional view of a part of the cylindrical portion 122, a gap forming portion 138a, and the variable member 180. As shown in FIG. 6, the second portion 182 is fixed to the cylindrical portion 122 by a welded portion W2d formed by performing laser weld from the outer peripheral surface of the cylindrical portion 122 toward a radially inner side. The position of the connection by the welded portion W2d is a position shifted from the front end surface of the step portion 139 toward the front side by a length d. The length d is longer than the length Lga of the gap forming portion 138a. Thus, the position of the connection by the welded portion W2d is a position shifted from the front end surface of the step portion 139 toward the front side by a length obtained by adding, to the length Lga, a length by which 100% of the length Lga is exceeded. The length Lga of the gap forming portion 138a is shorter than the length Lg of the gap forming portion 138 of Embodiments 1 to 3. In addition, the length d of the present embodiment is set to 75% of the length Lk of the second portion 182.

According to the reference embodiment, the second portion 182 can be fixed at the front side with respect to the front end of the gap forming portion 138a. Thus, even if the gap forming portion 138a is short, the pressure receiving portion of the second portion 182 can be shortened, and further a sensitivity change can be suppressed.

Figure 7:
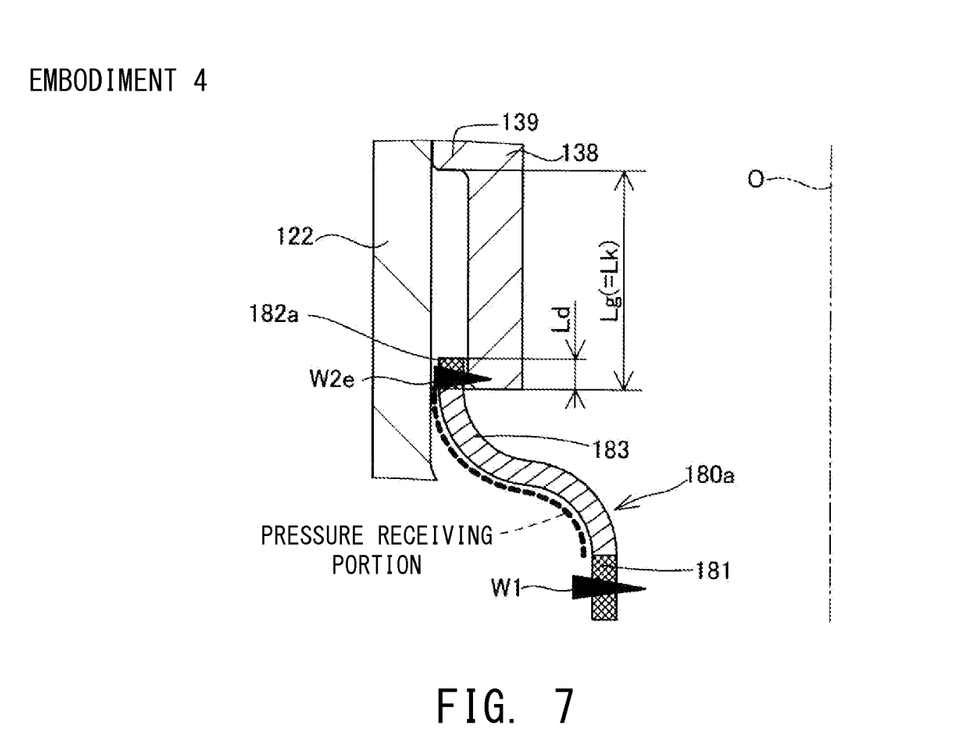
FIG. 7 Cross-sectional view of a part of a cylindrical portion, a gap forming portion, and a variable member (Embodiment 4).

Embodiment 4 will be described. FIG. 7 is a cross-sectional view of a part of the cylindrical portion 122, the gap forming portion 138, and a variable member 180a. As shown in FIG. 7, a second portion 182a of the variable member 180a is fixed to the gap forming portion 138 by a welded portion W2e. The length Ld of the second portion 182a is shorter than the length Lg. When the variable member 180a is formed as described above, the size and the weight of the variable member 180a can be reduced while the same effect of suppressing a sensitivity change as in Embodiment 1 is obtained.

Figure 8:
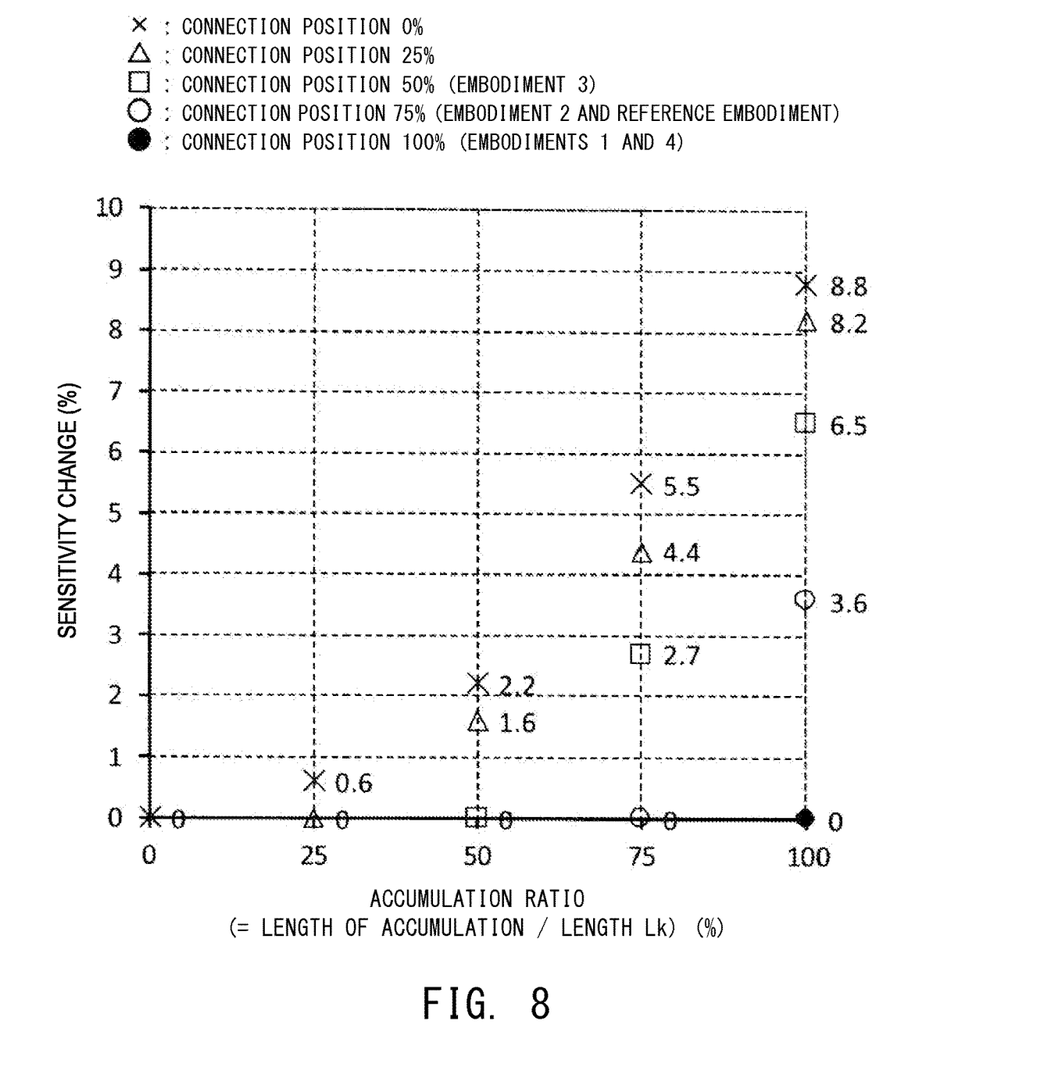
FIG. 8 Graph showing results of a numerical simulation.

FIG. 8 is a graph showing results of confirmation of the effect of the present invention described above through a numerical simulation. The vertical axis of the graph indicates a sensitivity change. If the sensitivity change is, for example, +8.8%, it means that the measurement sensitivity has increased by 8.8%. The horizontal axis of the graph indicates the ratio of a length for which a soot component accumulates in the clearance C1, relative to the length Lk of the second portion 182 (hereinafter, referred to as "accumulation ratio"). The length for which the soot component accumulates is the length from the front end surface of the step portion 139 to the front end of a portion where the soot component accumulates. Actually, accumulation of the soot component occurs from the rear of the gap G and grows toward its front end. Thus, the numerical simulation is also set such that no pressure is transmitted to a portion of the variable member 180 which portion is from the front end surface of the step portion 139 to the front end of a portion where the soot component accumulates.

The numerical simulation is executed for each of five conditions with the accumulation ratio being changed. The conditions are related to the position of connection by a welded portion W2. The welded portion W2 is a general term for the welded portions W2a to W2e. The position of the connection by the welded portion W2 is determined as a value obtained by dividing the length from the front end surface of the step portion 139 to the welded portion W2 by the length Lk. As described above, the length Lk is the length from the front end surface of the step portion 139 to the front end of the second portion 182. In the graph, marks □ indicate the case where the position of the connection is 50%, and correspond to Embodiment 3. In the graph, marks x indicate the case where the position of the connection is 0%. In the graph, marks Δ indicate the case where the position of the connection is 25%. In the graph, marks ○ indicate the case where the position of the connection is 75%, and correspond to In the graph, a mark ● indicates the case where the position of the connection is 100%, and corresponds to Embodiments 1 and 4.

The welded portion W2d of Reference Embodiment is a position which exceeds 100% when the front end surface of the step portion 139 is used as a reference and the length Lga of the gap forming portion 138a is set as a target to be compared. In Embodiments 1 and 4, since the length Lg and the length Lk are equal to each other, a value indicating the position of the welded portion W2 is the same even if either the length Lg or the length Lk is set as a target to be compared.

FIG. 8 shows only one value at a sensitivity change of 0% for each of the five conditions. For example, in the case where the welded portion W2 is 25% (the mark L), the sensitivity change is 0% even at 0% on the horizontal axis, but this value is not shown. As shown in FIG. 8, it is confirmed that a sensitivity change is suppressed further as the welded portion W2 is closer to the front side.

The present invention is not limited to the embodiments, examples, and modified embodiments described in the present specification, and can be embodied in various configurations without departing from the gist of the present invention. For example, the technical features in the embodiments, examples, and modified embodiments corresponding to the technical features in each mode described in the Summary of the Invention section can be appropriately replaced or combined to solve some of or all of the foregoing problems, or to achieve some of or all of the foregoing effects. Further, such technical features may be appropriately deleted if not described as being essential in the present specification. For example, the following is exemplified.

The present invention may be applied to a pressure sensor which replaces the heater portion 150 with a rod-shaped member not having a heater function and thus does not have a function as a glow plug.

The present invention may be applied to a glow plug with a pressure sensor which replaces the heater portion 150 with a ceramic heater and thus includes the ceramic heater.

The position of the connection by the welded portion W2 may not be a simple value such as 50%, 75%, or 100%, and may be, for example, any value which is not less than 50%. The value indicating the position is a value obtained when the front end surface of the step portion is used as a reference and the length of the gap is set as a target to be compared.

When the length of the gap is determined on the basis of the length of the gap forming portion, the length of the gap may be determined in consideration of a chamfered portion of the gap forming portion. That is, the length of the gap may be considered as being shorter by the chamfered portion of the gap forming portion.

The position of the connection by the welded portion W2 may be determined with the length from the front end surface of the step portion to the front end of the second portion being set as a target to be compared.

The gap forming portion may be a portion integrated with the housing.

The variable member may be connected directly to the heater portion or may be connected to the heater portion via another member.

The variable member may be connected directly to the gap forming portion or may be connected to the gap forming portion via another member.

The weld to form the welded portion W2 may not be performed over the entire circumference of the second portion and may be performed on a part of the circumference.

DESCRIPTION OF REFERENCE NUMERALS

100: glow plug
110: metallic shell
114: screw portion
120: cap portion
122: cylindrical portion
124: tapered portion
125: opening portion
130: housing
132: sensor fixing member
133: flange portion
134: transmission sleeve
138: gap forming portion
138a: gap forming portion
139: step portion
140: protection tube
142: tool engagement portion
144: terminal spring
146: metal terminal
148: connector member
150: heater portion
151: control coil
152: sheath tube
154: heat generation coil
155: insulating powder
156: seal member
160: pressure sensor
161: opening portion
162: metal diaphragm
164: piezoresistor
170: center shaft
180: variable member
180a: variable member
181: first portion
182: second portion
182a: second portion
183: bent portion
C1: clearance
C2: clearance
G: gap
O: axis
OD: axial direction
W1, W2: welded portion
W2a to W2e: welded portion

The invention claimed is:
1. A pressure sensor comprising:
a rod-shaped member extending along an axial direction;

a tubular housing within which the rod-shaped member is disposed in a state where a front end of the rod-shaped member projects therefrom;

a tubular tube portion disposed with a gap from an inner wall of the housing and having a rear end connected to the housing;

a variable member having a front end portion connected to the rod-shaped member and a rear end portion connected to the tube portion to ensure airtightness within the housing and configured to deform when the rod-shaped member is displaced relative to the housing along the axial direction; and an element, disposed at a rear side with respect to the variable member and within the housing, for measuring a pressure around the front end of the rod-shaped member on the basis of the displacement, wherein the rear end portion of the variable member extends along the tube portion in the axial direction, the gap formed between the tubular portion and the inner wall of the housing has a length from a rear end of the gap to a front end of the gap in the axial direction, a position W2a of the connection between the tube portion and the variable member in the axial direction is a position shifted from a rear end of the gap toward the front side by a length which is 50% or more of a length of the gap in the axial direction, the variable member extends beyond the rear of the position W2a along the tube portion in the axial direction, and a clearance C2 extending in the axial direction is present to the rear of the position W2a between the rear end portion of the variable member and the tube portion.

2. The pressure sensor as claimed in claim 1, wherein the rod-shaped member is a heater which generates heat when being energized.

3. The pressure sensor as claimed in claim 1, wherein the variable member has a thickness of not less than 0.13 mm and not greater than 0.23 mm.

4. The pressure sensor as claimed in claim 1, wherein the predetermined length is a length which is 75% or more of the length of the gap in the axial direction.

5. The pressure sensor as claimed in claim 4, wherein the predetermined length is a length which is 100% of the length of the gap in the axial direction.

* * * * *